Figure 1:
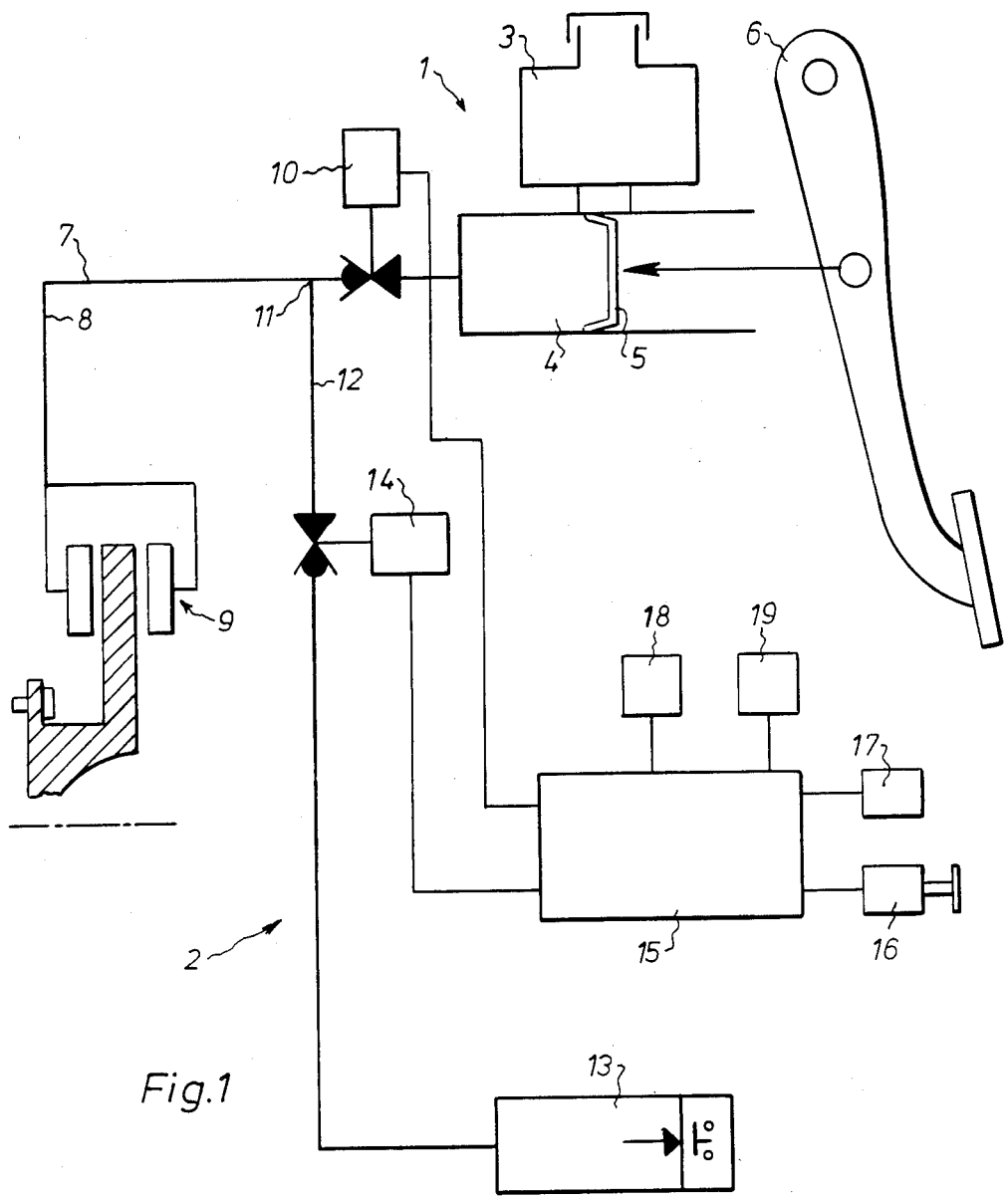

United States Patent [19]

Andersson et al.

[11] Patent Number: 4,799,570

[45] Date of Patent: Jan. 24, 1989

[54] ARRANGEMENT IN VEHICLE HYDRAULIC SERVICE BRAKE SYSTEMS

[75] Inventors: Lars Andersson, Sundbyberg; Bengt Kamph, Stockholm, both of Sweden

[73] Assignee: Autostop AB, Lidingo, Sweden

[21] Appl. No.: 921,455

[22] Filed: Oct. 22, 1986

[30] Foreign Application Priority Data

Oct. 22, 1985 [SE] Sweden .................... 8504977

[51] Int. Cl.$^4$ .................. B60K 28/00; B60K 19/02; B60T 7/12
[52] U.S. Cl. .......................... 180/275; 303/3
[58] Field of Search ............. 180/275, 279, 272, 287, 180/271, 277; 303/3

[56] References Cited

U.S. PATENT DOCUMENTS

| | | | |
|---|---|---|---|
| 2,588,815 | 3/1952 | Fasolino | 180/82 |
| 3,119,477 | 1/1960 | Ryder | 192/3 |
| 3,810,520 | 5/1974 | Iwata et al. | 180/275 |
| 3,986,577 | 10/1976 | Ebbesson et al. | 180/92 |
| 4,146,107 | 3/1979 | Ebbeson et al. | 180/275 |
| 4,363,376 | 12/1982 | Sjöberg et al. | 180/275 |
| 4,403,674 | 9/1983 | Viall, Sr. et al. | 180/275 |
| 4,565,411 | 1/1986 | Seiber | 303/110 |
| 4,603,918 | 8/1986 | Leiber et al. | 303/6 |

FOREIGN PATENT DOCUMENTS 0099862  2/1984  European Pat. Off. .
2036181  6/1980  United Kingdom .

OTHER PUBLICATIONS

Patent Abstracts of Japan, vol. 7, No. 47 (M-196) (1192), Feb. 24, 1983 & JP-A-57 195 903.

Primary Examiner—Richard A. Bertsch
Attorney, Agent, or Firm—Shapiro and Shapiro

[57] ABSTRACT

The present invention relates to an arrangement in vehicle hydraulic service brake systems for activating at least one of two conventional braking cirucits included in the brake system when an obstacle is detected, by means of a sensor, in the direction in which the vehicle is travelling. The novel matter of the invention resides in that a pressure accumulator is connected to the brake circuit via a valve unit which is adapted, in normal position, to establish free communication between the vehicle main cylinder and the vehicle wheel brakes, and to permit pressure build-up of the pressure accumulator upon depression of the vehicle brake pedal. The sensor is adapted, upon actuation, to activate the valve unit, whereby the communication between the vehicle wheel brakes and the vehicle main cylinder is interrupted, and the pressure accumulator is connected with the wheel brakes for application thereof.

12 Claims, 2 Drawing Sheets

ARRANGEMENT IN VEHICLE HYDRAULIC SERVICE BRAKE SYSTEMS

The present invention relates to an arrangement in vehicle hydraulic service brake systems for activating at least one of two conventional braking circuits included in the brake system when an obstacle is detected, by means of a sensor, in the direction in which the vehicle is travelling.

Different types of sensors are known which are capable of activating, via the operating unit, the brake system of a vehicle when an obstacle is sensed in the direction in which the vehicle is travelling. Besides mechanical sensors which are activated upon direct contact with the obstacle, also sensors utilizing ultrasonics, photocells, electrical contact means etc. are known.

Swedish patent specification No. 405,953 discloses an arrangement in compressed air operated vehicle brake systems for activating the brake system when a sensor detects an obstacle in the direction in which the vehicle is travelling. This sensor is an electrical contact device which actuates a valve unit for supplying compressed air directly from the parking brake circuit to the rake cylinders of the service brake circuit for application of the wheel brakes. The brake application force is obtained from the compressed air container of the parking brake, which container is supplied in conventional manner from a compressor operated by the vehicle. This prior art arrangement operates satisfactorily with compressed air brake systems where use may be made of the existing compressed air container and compressor, but is not applicable to a hydraulic brake system where the pressure medium is pressurised only during braking, and the brake system has no pressure source and/or accumulator. The provision of a motor driven pump would not be economically justifiable.

It is the object of this invention to provide an arrangement in vehicle hydraulic service brake systems which can be connected, without substantial modification, in the existing and conventional brake system without jeopardizing the proper function thereof, and which is simple, reliable in operation and economical, said arrangement being adapted, upon sensing of an obstacle, especially when the vehicle is reversed, to automatically activate the wheel brakes and maintain them in activated position.

This object is achieved, in accordance with the invention, by means of a pressure accumulator which, via a valve unit, is connected to the brake circuit. The valve unit is adapted, in normal position, to establish free communication between the vehicle main cylinder and the vehicle wheel brakes, and to permit pressure build-up of the pressure accumulator upon depression of the vehicle brake pedal. The sensor is adapted, upon actuation, to activate the valve unit, whereby the communication between the vehicle wheel brakes and the vehicle main cylinder is interrupted, and the pressure accumulator is connected with the wheel brakes for application thereof.

Figure 2:
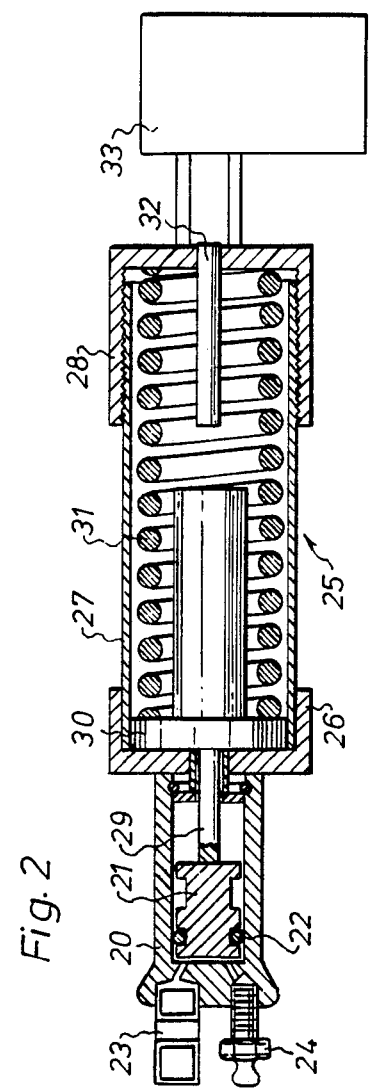

The invention will now be described by way of an example, reference being had to the accompanying drawings in which:

FIG. 1 shows diagrammatically the main components of a vehicle hydraulic brake system comprising the emergency stop device according to the invention, and FIG. 2 is a section of a preferred embodiment of a pressure accumulator that may be used with the arrangement according to the invention.

In FIG. 1, one of two conventional brake circuits included in a vehicle hydraulic brake system is generally designated 1, while the arrangement according to the invention is generally designated 2. Naturally, both brake circuits of the brake system may be equipped with the arrangement according to the invention, and in those cases where the brake system comprises but one circuit, this circuit may be equipped with the arrangement according to the invention. However, it is preferred to provide but one brake circuit with the arrangement according to the invention.

The brake circuit 1 comprises a brake fluid container 3 connected to an underlying main cylinder 4. A piston 5 slidably mounted in said main cylinder is connected in known manner via a link mechanism (not shown) with the brake pedal 6 of the vehicle. Extending from the main cylinder 4 is a main brake fluid line 7 which, via branch lines 8, is connected in known manner to three of the four vehicle wheel brakes 9 which may be of the disk, multiple-disk or drum type, but are here shown to be disk brakes.

Connected in the main brake line 7 is a first electromagnetically operable valve 10 and a T-piece 11. The valve is of the NO (normally open) type, which means that the valve is open in the unactuated state and allows free communication between the main cylinder 4 and the vehicle wheel brakes 9. The valve preferably is a non-return valve which in closed position permits fluid to flow from but not to the main cylinder 4. However, the valve may also be a stop valve.

A side line 12 is connected to the main brake line 7 via the T-piece 11 between the first valve 10 and the branch lines 8. The side line 12 connects the main brake line 7 with a pressure accumulator 13 via a second electromagnetically operable valve 14 which is of the NC (normally closed) type, which means that the valve is closed in the unactuated state. The valve the is a non-return valve which in closed position permits pressure fluid to flow from the main brake line 7 to the pressure accumulator 13, but not from the pressure accumulator to the main brake line. The valve opens upon actuation and allows pressure fluid to flow from the pressure accumulator to the main line.

In the normal operation of the brake circuit, the first valve 10 is open and the second valve 14 is closed, whereby free communication is established between the vehicle wheel brakes 9 and the main cylinder 4.

The two valves 10, 14 are connected to a control circuit 15. Also connected to the control circuit is a sensor 16 which, in this case, is an electrical contact means which, upon contact with an obstacle occurring in the direction in which the vehicle travels, provides a signal to the control circuit, thereby causing the first valve 10 to assume closed position and to interrupt the communication between the wheel brakes 9 and the main cylinder 4 so that no pressure fluid can flow from the wheel brakes to the main cylinder. (The pressure fluid may, however, flow in the opposite direction.) At the same time, or preferably fractions of a second later (which is controlled by means of a timing circuit in the control circuit), the second valve 14 is caused to open so that pressure fluid flows from the pressure accumulator 13 via the lines 12, 7, 8 to the wheel brakes 9 for application thereof. Because the first valve 10 closes before the second valve 14 opens, no pressure fluid can flow from the pressure accumulator 13 to the main cylinder 4. Such a flow cannot be allowed since it could damage the piston 5 and cause brake fluid to be injected at high pressure into the brake fluid container 3.

Although the valves 10 and 14 have been shown as two separate units, they may of course be replaced by a three-way valve or a double-acting valve unit, provided that they give the function described above.

The pressure in the pressure accumulator 13 is built up by means of the brake pedal 6. Upon depression of the pedal, the wheel brakes 9 are applied. At the same time, the side line 12 is pressurized. If the pressure build-up in the pressure accumulator 13 is not complete, the non-return valve 14 opens after the wheel brakes have been applied, and pressure fluid is supplied to the pressure accumulator. Because of the stiffness of the spring in the non-return valve 14 (and the pressure in the pressure accumulator) the brakes will be applied before the pressure in the accumulator is built up. If the pressure accumulator is completely empty, the build-up of pressure therein necessitates an increased depression of the brake pedal by about one quarter of the distance between the extreme positions of the brake pedal. Upon braking with a conventional brake system, only about half the distance between the extreme brake pedal positions is utilized, and this means that a single depression of the brake pedal is more than adequate to provide on the one hand an application of the wheel brakes and, on the other hand, a build-up of the pressure within the pressure accumulator. The additional pedal effort required to keep the pressure fully built up is so insignificant that it is not perceived by the driver.

Alternatively, the pressure of the pressure accumulator may be built up successively during a succession of brake applications.

To enable the arrangement according to the invention to be activated only when the vehicle is reversed, a position sensor 17 for the vehicle gear selector (not shown) is connected to the control circuit 15. In this instance, there is required in addition to a signal from the sensor 16 to activate the arrangement in accordance with what has been described above, also a signal from the position sensor 17 which is obtained only when the gear selector is in reverse gear position. If the arrangement instead is to be activated at low forward speed and/or in reverse, a position sensor must thus be connected which is actuated by the vehicle gear selector in corresponding positions.

The dashboard of the vehicle preferably is provided with an indicator 18 which indicates when the arrangement according to the invention has been activated, i.e. that the vehicle has struck an obstacle and the brakes have been applied by the pressure fluid from the pressure accumulator 13. When, for this reason, the wheel brakes have been applied, this condition of the vehicle preferably is maintained, i.e. the control circuit 15 maintains the first valve 10 closed and the second valve 14 open. To enable the driver to drive on after he has established the reason for the emergency stop, the vehicle is provided with a switch 19 to protect the valves against extraneous action. This can be done for example by interrupting the communication between the control circuit 15 and the respective valve 10, 14, or by interrupting the current supply to the control system. The valves then take up their normal positions, i.e. the valve 10 opens and the valve 14 closes. The brake system then operates as a conventional brake system. After resetting the switch 19, the pressure in the pressure accumulator is built up during the first subsequent depression of the brake pedal, for instance at a normal braking operation, whereupon the arrangement according to the invention is ready for the next activation.

The pressure accumulator 13 may be designed in several different ways. For example, the pressure accumulator may comprise a housing, the interior of which is divided by a diaphragm or a slidable piston into a pressure chamber connected to the brake circuit and a chamber for a compressible medium. Instead of a compressible medium, a spring assembly may be used.

FIG. 2, however, illustrates a preferred embodiment of the pressure accumulator 13. A piston 21 having a seal 22 is slidably mounted in a housing 20 which is connected, via a connection nipple 23, to the side line 12 (see FIG. 1). Furthermore, a venting nipple 24 is connected to the housing. The chamber defined by the interior of the housing, the piston 21 and the end piece in which the nipples 23, 24 are mounted, defines the pressure chamber of the pressure accumulator. Also connected to the housing 20 is a spring assembly 25 with an end piece 26 in a manner which is conventional and therefore not shown in detail. A cylindrical casing 27 is fixedly mounted in the end piece. The free end of the casing is threaded to receive a second end piece 28. A piston rod 29 extends from the piston 21 and projects into the casing 27 in which the piston rod is formed with a flange 30. A spring 31 is inserted between the flange 30 and the second end piece 28. The pretension of the spring can be controlled by means of the threaded connection between the casing 27 and the end piece 28. By suitable selection of the spring tension, and by means of the threaded connection, the force which acts on the piston and thus counterbalances the pressure in the pressure accumulator may be adapted according to need, which means that the arrangement according to the invention can be adapted to most vehicles with hydraulic brake systems. A pin 32 projecting into the casing 27 is slidably mounted in the second end piece 28. The pin also projects into a transducer housing 33 via a mounting (not shown).

When the pressure accumulator has been completely pressurized, the piston 21 and the piston rod 29 are maximally displaced towards the right in the Figure. The piston rod end located in the casing 27 urges the pin 32 against the action of the spring into engagement with a known flip-flop (not shown). A circuit is now closed, and a light-emitting diode on the vehicle dashboard indicates that the pressure accumulator has been completely pressurized. If the pressure accumulator should not be completely pressurized, the pin is not pushed so far into the transducer housing 33, in the manner described above, for which reason the flip-flop assumes a different position and a different circuit is closed, and a different light-emitting diode on the dashboard warns the driver that the pressure accumulator has not been completely pressurized. If the pressure is to be sensed continuously, i.e. if a continuous indication of the position of the piston 21 in the housing 20 is desired, a known sensor providing the desired function may be mounted in the transducer housing 33.

When the pressure accumulator is completely pressurized, the piston is not, at automatic reversing stop, urged into engagement with the end piece carrying the nipples 23, 24, but has a stand-by movement.

Naturally, the invention is not restricted to the embodiments described above, but may be modified within the scope of the appended claims. For example, the vehicle may be equipped with several sensors mounted at suitable locations on the vehicle. Furthermore, the control circuit and the sensor may be in the form of a suitable hydraulic circuit, the valves being controlled hydraulically instead of electrically. Also an electro-hydraulic valve control system may be used.

What we claim and desire to secure by Letters Patent is:

1. In a vehicle having a hydraulic brake circuit in which a master cylinder is connected to wheel brakes of the vehicle for applying pressurized hydraulic fluid to the vehicle wheel brakes upon depression of a brake pedal of the vehicle, an arrangement for applying the vehicle wheel brakes when an obstacle is encountered in the path of the vehicle, said arrangement comprising:
   means for detecting an obstacle in the path of the vehicle,
   a hydraulic pressure accumulator linked to said hydraulic brake circuit by way of valve means, said valve means having a normal condition for connecting said master cylinder to said wheel brakes and to said hydraulic pressure accumulator such that depression of said brake pedal causes application of the wheel brakes and hydraulic fluid pressure build up in said hydraulic pressure accumulator, and a second condition for preventing backflow of hydraulic fluid into said master cylinder and connecting said hydraulic pressure accumulator to said wheel brakes such that the wheel brakes are applied by pressurized hydraulic fluid from said hydraulic pressure accumulator, and
   control means responsive to said obstacle detecting means for switching said valve means from said normal condition to said second condition.

2. An arrangement according to claim 1, characterized in that said valve means comprises a first electromagnetically operable valve connected in said hydraulic brake circuit and a second electromagnetically operable valve connected between said hydraulic brake circuit and said hydraulic pressure accumulator, that in said normal condition of said valve means, said first valve permits free flow of hydraulic fluid between master cylinder and said wheel brakes and said second valve only permits hydraulic fluid to flow from said hydraulic brake circuit to said hydraulic pressure accumulator, and that in said second condition of said valve means, said first valve prevents backflow of hydraulic fluid into said master cylinder and said second valve permits hydraulic fluid flow from said hydraulic pressure accumulator to said hydraulic brake circuit.

3. An arrangement according to claim 2, characterized in that means for indicating the position of said first valve and means for resetting said first valve from its second condition to its normal condition are connected to said control means.

4. An arrangement according to claim 1, characterized in that a position sensor for a gear selector of the vehicle is connected to said control means, and said control means switches said valve means from said normal condition to said second condition when said position sensor detects that the position of said gear selector corresponds to a predetermined gear and said obstacle detecting means detects an obstacle in the path of the vehicle.

5. An arrangement according to claim 1, characterized in that said hydraulic pressure accumulator comprises a housing which is divided by one of a diaphragm and a slidable piston into a pressure chamber and a chamber for a compressible medium, said pressure chamber being connected to said hydraulic brake circuit via and said valve means.

6. An arrangement according to claim 5, characterized in that said piston is controllably biased by a spring via a piston rod, and a sensing means is provided adjacent said hydraulic pressure accumulator for sensing the position of said piston within said cylinder to provide an indication of whether said hydraulic pressure accumulator has been completely pressurized.

7. An arrangement according to claim 1, characterized in that said hydraulic pressure accumulator comprises a cylinder connected to said hydraulic brake circuit via said valve means and a spring-loaded piston disposed within said cylinder.

8. A hydraulic braking system for a vehicle, comprising a master cylinder operable upon depression of a brake pedal of the vehicle, first hydraulic fluid line means connecting an output of said master cylinder to wheel brakes of the vehicle, a hydraulic pressure accumulator, second hydraulic fluid line means connecting said hydraulic pressure accumulator to said first fluid hydraulic fluid line means, valve means disposed in said first fluid line means and said second fluid line means for controlling hydraulic fluid flow therein, said valve means having a normal condition for placing said master cylinder is free fluid communication with said wheel brakes via said first fluid line means and placing said first fluid line means in one-directional communication with said hydraulic pressure accumulator via said second fluid line means such that hydraulic fluid may flow from said first fluid line means to said high pressure accumulator but not in an opposite direction, said valve means having a second condition for blocking fluid flow from said first fluid line means to said master cylinder and establishing fluid communication between said hydraulic pressure accumulator and said first fluid line means in an opposite direction to said one direction such that pressurized hydraulic fluid may flow from said hydraulic pressure accumulator to the vehicle wheel brakes via said second and first fluid line means, and means for causing said valve means to switch from said first condition to said second condition in response to the presence of an obstacle in the path of the vehicle.

9. A hydraulic braking system according to claim 8, wherein said valve means comprises first non-return valve means disposed in said first fluid line means between said master cylinder and said second fluid line means and second non-return valve means disposed in said second fluid line means between said first fluid line means and said hydraulic pressure accumulator.

10. A hydraulic braking system according to claim 9, wherein each of said non-return valve means is constituted by a respective non-return valve.

11. A hydraulic braking system according to claim 8, wherein said hydraulic pressure accumulator comprises a cylinder housing a spring-loaded piston and connected at one side of said piston to said second fluid line means.

12. A hydraulic braking system according to claim 11, wherein said hydraulic pressure accumulator includes a piston rod which extends from an opposite side of said piston, said braking system further including means responsive to the position of said piston rod for providing an indication of whether said hydraulic pressure accumulator is fully pressurized.

* * * * *